United States Patent [19]

Hoerauf et al.

[11] 4,258,178

[45] Mar. 24, 1981

[54] DISCHARGING GRANULAR LINEAR POLYCONDENSATES

[75] Inventors: Werner Hoerauf; Guenter Valentin, both of Ludwigshafen, Fed. Rep. of Germany

[73] Assignee: BASF Aktiengesellschaft, Fed. Rep. of Germany

[21] Appl. No.: 965,265

[22] Filed: Dec. 1, 1978

[30] Foreign Application Priority Data

Dec. 15, 1977 [DE] Fed. Rep. of Germany .... 2755941

[51] Int. Cl.³ .............................. C08F 2/36; C08F 6/00
[52] U.S. Cl. .................................... 528/502; 528/483; 528/503
[58] Field of Search .................. 264/85; 528/481, 483, 528/502, 503; 34/13, 168

[56] References Cited

U.S. PATENT DOCUMENTS

| | | | |
|---|---|---|---|
| 2,944,047 | 7/1960 | Schutze et al. | 528/483 |
| 3,544,525 | 12/1970 | Balint et al. | 528/483 |
| 3,821,171 | 6/1974 | Beaton | 528/481 |
| 4,092,784 | 6/1978 | Dietrich et al. | 34/13 |

FOREIGN PATENT DOCUMENTS 618502  9/1935  Fed. Rep. of Germany .

*Primary Examiner*—Edward J. Smith
*Attorney, Agent, or Firm*—Keil & Witherspoon

[57] ABSTRACT

A process for discharging a granular organic polymer, which is sensitive to molecular oxygen at elevated temperatures, from a treatment zone in which it has been continuously treated, at above 70° C., with an inert gas which is free from molecular oxygen, and has subsequently been cooled, which process comprises withdrawing the polymer at ≦50° C. through a narrow elongate tubular discharge zone, the said zone always being filled with granular polymer.

4 Claims, No Drawings

DISCHARGING GRANULAR LINEAR POLYCONDENSATES

Polymers such as polyethylene terephthalate, nylon-6,6 or nylon-6 are treated, after their manufacture, in the form of granules at from 30° to 50° C. below their melting point with inert gases which are free from molecular oxygen in order to dry the granules and also to effect a post-condensation. Such a process is described, for example, in Swiss Pat. No. 385,744 and German Laid-Open Application DOS No. 2,530,304. In this process the granular polymer flows through the treatment zone, under gravity, by plug flow and is cooled in the lower part of the treatment zone and discharged through a funnel-shaped zone. When discharging the granules it is however unavoidable, even when using precautionary measures, that molecular oxygen from the atmosphere penetrates into the treatment zone. This molecular oxygen damages the heated polymer. Even if only a small proportion of the polymer is damaged, this proportion is present as a mixture with the undamaged polymer and hence reduces the overall quality. This is undesirable since, in the case of polymers for the manufacture of filaments, the quality has to meet very high standards. To avoid oxygen from the surrounding atmosphere penetrating through the discharge orifice when discharging the granules it is necessary first to pass the granules into a nitrogen-flushed discharge vessel, then to isolate the vessel from the treatment chamber when the vessel is full, and thereafter to discharge the granules from the vessel. Such a procedure is very expensive.

It is an object of the present invention to effect the discharge of granular polycondensates from such treatment zones in such a way that damage by molecular oxygen which penetrates is avoided.

We have found that this object is achieved by providing a process for discharging granular organic polymers which are sensitive to molecular oxygen at elevated temperatures, from a treatment zone in which the polymer has been continuously treated, at above 70° C., with an inert gas which is free from molecular oxygen, and has subsequently been cooled, wherein the granular polymer is withdrawn at $\leq 50°$ C. through a narrow elongate tubular discharge zone which is always filled with granular polymer.

The novel process has the advantage that it avoids the penetration of molecular oxygen from the surrounding atmosphere into the treatment zone an hence avoids damage to the hot polymer. Furthermore, the novel process has the advantage that expensive shut-off devices and other precautions to ensure the exclusion of molecular oxygen are not necessary. Another advantage of the novel process is that it can be automated in a simple manner.

Preferred organic polymers are polyesters, especially those derived from alkanedicarboxylic acids of 4 to 10 carbon atoms or benzenedicarboxylic acids or naphthalenedicarboxylic acids, and alkanediols of 2 to 6 carbon atoms and/or polymeric alkanediols having a molecular weight of up to 6,000. Further preferred polymers are nylons, especially those derived from alkanedicarboxylic acids of 6 to 12 carbon atoms and alkanediamines of 6 to 12 carbon atoms or aromatic diamines. Yet further preferred polymers are polylactams which are derived from lactams of 6 to 12 carbon atoms. Examples of suitable polymers are polyethylene terephthalate, polybutylene terephthalate or their copolymers with one another or with other polycondensable dicarboxylic acids and diols, for example block copolyether-esters, polycaprolactam, polylauryl-lactam, nylon-6,6 or nylon-6,10.

The process has attained particular industrial importance for nylons, such as nylon-6,6 and especially for polycaprolactam. In general, the granules have a length of from 1 to 5 mm and a diameter of from 1 to 5 mm.

The granular polymer flows continuously through a preferably vertical treatment zone in plug flow. Whilst doing so, it is treated with inert gases at above 70° C., for example at up to 200° C. in the case of polycaprolactam and, in the case of other granules, at from 10° to 100° C. below the softening point of the particular polymer. Nitrogen is an example of a suitable inert gas. The gases must be free from molecular oxygen, ie. they should have an oxygen content of $<2$ ppm. In the lower part of the treatment zone of polymer is cooled to 50° C. and collected in a cone-shaped section. Preferably, the cone-shaped section is at all times only partially filled. Suitable procedures are described, for example, in Swiss Pat. No. 385,744 and German Laid-Open Application DOS No. 2,530,304.

According to the invention, the granular polycondensate is discharged from the conical section of the treatment zone through a narrow elongate tubular discharge zone. The temperature of the granules at that stage is $\leq 50°$ C. The diameter of the discharge zone is advantageously at least 4 times the diameter of the granules, to avoid bridging, and at most 0.07 times the diameter of the particular treatment zone, preferably at least 10 times the diameter of the granules and at most 0.03 times the diameter of the treatment zone. Suitable discharge zones for example have a diameter of from 32 to 70 mm. The length of the discharge zone is preferably from 50 to 100 times its diameter. In industrial operation the length of such a discharge zone is, for example, from 5 to 10 m. Advantageously, its length is such that the material with which it is filled compensates for the fact that the pressure in the treatment zone is higher, for example by 1,000 mm water column, than atmospheric pressure. Accordingly, it is an essential characteristic of the invention that the elongate discharge zone is constantly filled with granular polymer. To ensure that it is completely filled, the elongate discharge zone should of course preferably be arranged substantially vertically.

At the lower end of the discharge zone, the granules which issue are withdrawn continuously or intermittently by conventional conveying devices, for example a vibratory chute, a conveyor belt or, preferably, a pneumatic conveyor. A further advantage of the process is that air can be used as the conveying medium without damaging the granules. Additional isolation from the treatment zone is made unnecessary by the procedure according to the invention.

In a preferred industrial embodiment, signals respectively indicating the minimum and maximum levels of the granular polymer in the outlet cone of the treatment zone actuate the conveying device at the lower end of the elongate discharge zone and thus ensure that the discharge zone always remains filled and that material can be discharged without additional operations.

Though the actual mode of operation is not known, we assume that the treatment with oxygen-free nitrogen carried out at an elevated temperature desorbs the oxygen from the surface of the granules. On discharge through the elongate discharge zone, the cooled granules absorb molecular oxygen on their surface from the air penetrating from the end of the discharge zone, without being damaged, and this absorption is so complete that the granules which are at a high temperature in the treatment zone are protected against damage by oxygen. Absorption of the oxygen from the surrounding atmosphere would in any case occur on the cold granules whilst they are being packaged.

The process according to the invention can be used in connection with discharging granular polymers from drying zones or in connection with the discharge of granular polymers from solid-state condensation zones, such as are employed, for example, for the manufacture of high molecular weight nylons.

The Example which follows illustrates the process according to the invention.

EXAMPLE

Polycaprolactam granules of 2.5 mm diameter and 2.7 mm length are continuously allowed to move downward under gravity in a vertical vessel (height 22 mm, internal width 2 m) and whilst doing so are heated to 160° C. with nitrogen ($O_2$ content <2 ppm).

In the lower quarter of the vessel the granules are cooled to 50° C., collected in the cone of the vessel and fed via a 7 m long and 70 mm wide vertical tube to the nozzle of a pneumatic conveyor. The conveying air is switched on and off by means of maximum and minimum level contacts in the cone of the tower. The output is 3 t of granules per hour. The hot granules in the vessel do not suffer any damage by oxygen.

We claim:

1. A process for discharging granular nylons which are derived from alkanedicarboxylic acids of 6 to 12 carbon atoms and alkenediamines of 6 to 12 carbon atoms or polylactams which are derived from lactams of 6 to 12 carbon atoms, which are sensitive to molecular oxygen at elevated temperatures, said granules having a length of from 1 to 5 mm and a diameter of from 1 to 5 mm, from a treatment zone in which the nylons or polylactams have been continuously treated, at above 70° C., with inert gases which are free from molecular oxygen, and have subsequently been cooled, which process comprises withdrawing the nylons or polylactams at $\leq$ 50° C. through a narrow elongated discharge tube, the said tube always being filled with granular nylons or polylactams, whereby the granules absorb molecular oxygen on their surface within the discharge zone and thus prevent oxygen in the air entering the end of the discharge tube from contacting the hot granules in the treatment zone.

2. The process of claim 1, wherein the diameter of the discharge zone is at least 4 times the granule diameter and at most 0.07 times the diameter of the particular treatment zone, and the length of the discharge zone is from 50 to 100 times its diameter.

3. The process of claim 2 wherein the discharge zone has a diameter of 32 to 70 mm and the length of the discharge zone is from 5 to 10 m.

4. The process of claim 1 wherein the granules are discharged through the tubular discharge tube in a substantially vertical direction.

* * * * *